(12) United States Patent
Chen et al.

(10) Patent No.: US 8,931,141 B2
(45) Date of Patent: Jan. 13, 2015

(54) PLANETARY TYPE DUAL-SHAFT HINGE

(71) Applicant: Yuan Deng Metals Industrial Co., Ltd., Taoyuan (TW)

(72) Inventors: Ching-Yao Chen, Taoyuan (TW); Shih-Pin Yang, Taoyuan (TW)

(73) Assignee: Chin-Hsing Horng, Kueishan Hsiang (TW)

( * ) Notice: Subject to any disclaimer, the term of this patent is extended or adjusted under 35 U.S.C. 154(b) by 0 days.

(21) Appl. No.: 13/906,160

(22) Filed: May 30, 2013

(65) Prior Publication Data

US 2014/0352113 A1    Dec. 4, 2014

(51) Int. Cl.
   *E05D 3/06*     (2006.01)
(52) U.S. Cl.
   CPC ........................................ *E05D 3/06* (2013.01)
   USPC .............................................. 16/366; 16/368
(58) Field of Classification Search
   CPC ............. E05D 3/06; E05D 3/12; E05D 3/127; E05D 7/06; E05D 7/085; E05D 7/08; E05D 2003/00; E05D 2003/06; E05D 2003/163; E05D 2700/04; E05Y 2600/00; E05Y 2600/32
   USPC .................................... 16/366, 368, 386, 387
   See application file for complete search history.

(56) References Cited

U.S. PATENT DOCUMENTS

| | | | |
|---|---|---|---|
| 6,253,419 B1 * | 7/2001 | Lu ................................... | 16/340 |
| 6,519,812 B2 * | 2/2003 | Ko et al. .......................... | 16/354 |
| 7,155,266 B2 * | 12/2006 | Stefansen ................... | 455/575.3 |
| 7,832,056 B2 * | 11/2010 | Kuwajima et al. .............. | 16/354 |
| 7,900,323 B2 * | 3/2011 | Lin .................................. | 16/366 |
| 7,907,415 B2 * | 3/2011 | Ueyama ......................... | 361/749 |
| 2007/0101541 A1 * | 5/2007 | Yin et al. ......................... | 16/221 |
| 2008/0000048 A1 * | 1/2008 | Petrella ........................... | 16/214 |
| 2009/0056073 A1 * | 3/2009 | Lin .................................. | 16/235 |
| 2010/0071155 A1 * | 3/2010 | Ueyama et al. ................. | 16/250 |
| 2011/0041290 A1 * | 2/2011 | Herglotz et al. ................ | 16/375 |
| 2011/0265288 A1 * | 11/2011 | Chiang ........................... | 16/341 |
| 2011/0289726 A1 * | 12/2011 | Zhang et al. .................... | 16/250 |
| 2012/0192381 A1 * | 8/2012 | Zhang et al. .................... | 16/366 |
| 2013/0135809 A1 * | 5/2013 | Uchiyama et al. ........ | 361/679.09 |
| 2013/0187525 A1 * | 7/2013 | Chuang ......................... | 312/326 |

* cited by examiner

Primary Examiner — Roberta Delisle

(57) ABSTRACT

A planetary type dual-shaft hinge includes a female shaft member, a male shaft set rotatably inserted through the female shaft member, and a transmission mechanism including a first transmission member and a second transmission member respectively affixed to the first shaft and the second shaft, and a link coupled between the first transmission member and the second transmission member. The two pivoting points between the link and the first and second transmission members are respectively deviated from the two connection points between the first and second transmission member and the first and second shaft, so that when the hinge is used in a flip-up electronic apparatus and the cover member of the electronic apparatus is opened from the base member thereof, the first shank can be turned about the second shaft, smoothening the relative movement between the cover member and the base member.

5 Claims, 6 Drawing Sheets

PLANETARY TYPE DUAL-SHAFT HINGE

BACKGROUND OF THE INVENTION

1. Field of the Invention

The present invention relates to hinge technology and more particularly, to a planetary type dual-shaft hinge, which consists of a female shaft member, a male shaft set and a transmission mechanism, and is practical for use in a flip-up electronic device to smoothen the pivoting motion of the cover member of the flip-up electronic device relative to the base member of the flip-up electronic device.

2. Description of the Related Art

Hinges are intensively used in flip-up mobile electronic devices, such as notebooks, smart phones, and etc. to pivotally connect a base member and a cover member together, allowing only a limited angle of rotation between them. Some flip-up mobile electronic devices allow the cover member to be turned from the top side of the base member to the bottom side thereof, enabling the flip-up mobile electronic devices to be used as a tablet computer. A hinge for this application is a dual-shaft design. Taiwan Patent Publication Number M413776 discloses a dual-shaft hinge design. According to this design, first coupling means and second coupling means are provided at two opposite sides of connection plate means; the first coupling means provides a first opening at an end edge thereof adjacent to one side of connection plate means; the second coupling means provides a second opening at an end edge thereof adjacent to an opposite side of connection plate means; a first shaft and a second shaft are respectively mounted in the first coupling means and the second coupling means. When opening a cover member from a base member of a flip-up electronic apparatus using the hinge, the first shaft and the second shaft are rotated one after another in a proper order, allowing the cover member to be easily lifted with less effort. However, when reversing the cover member relative to the base member to close the flip-up electronic apparatus, mush resisting force will be produced. According to this conventional design, the first coupling means and the second coupling means can wear quickly with use, resulting in elastic fatigue losing and losing their functions to rotate in sequence.

SUMMARY OF THE INVENTION

The present invention has been accomplished under the circumstances in view. It is the main object of the present invention to provide a planetary type dual-shaft hinge, which is practical for use in a flip-up electronic apparatus, smoothening the relative movement between the cover member and base member of the flip-up electronic apparatus.

To achieve this and other objects of the present invention, a planetary type dual-shaft hinge in accordance with the present invention comprises a female shaft member, a male shaft set, and a transmission mechanism. The female shaft member comprises a shaft body defining a first barrel and a second barrel in a parallel manner. The male shaft set comprises a first shaft rotatably inserted through the first barrel of the female shaft member, and a second shaft rotatably inserted through the second barrel of the female shaft member. The transmission mechanism comprises a first transmission member fixedly connected to one end of the first shaft, a second transmission member fixedly connected to one end of the second shaft, and a link having opposite first end and second end thereof respectively pivotally coupled to the first transmission member and the second transmission member. The first transmission member and the second transmission member are disposed at one same side relative to the female shaft member. Further, the pivoting point between the link and the first transmission member is deviated from the connection point between the first transmission member and the first shaft. Further, the pivoting point between the link and the second transmission member is deviated from the connection point between the second transmission member and the second shaft.

DETAILED DESCRIPTION OF THE PREFERRED EMBODIMENT

Figure 1:
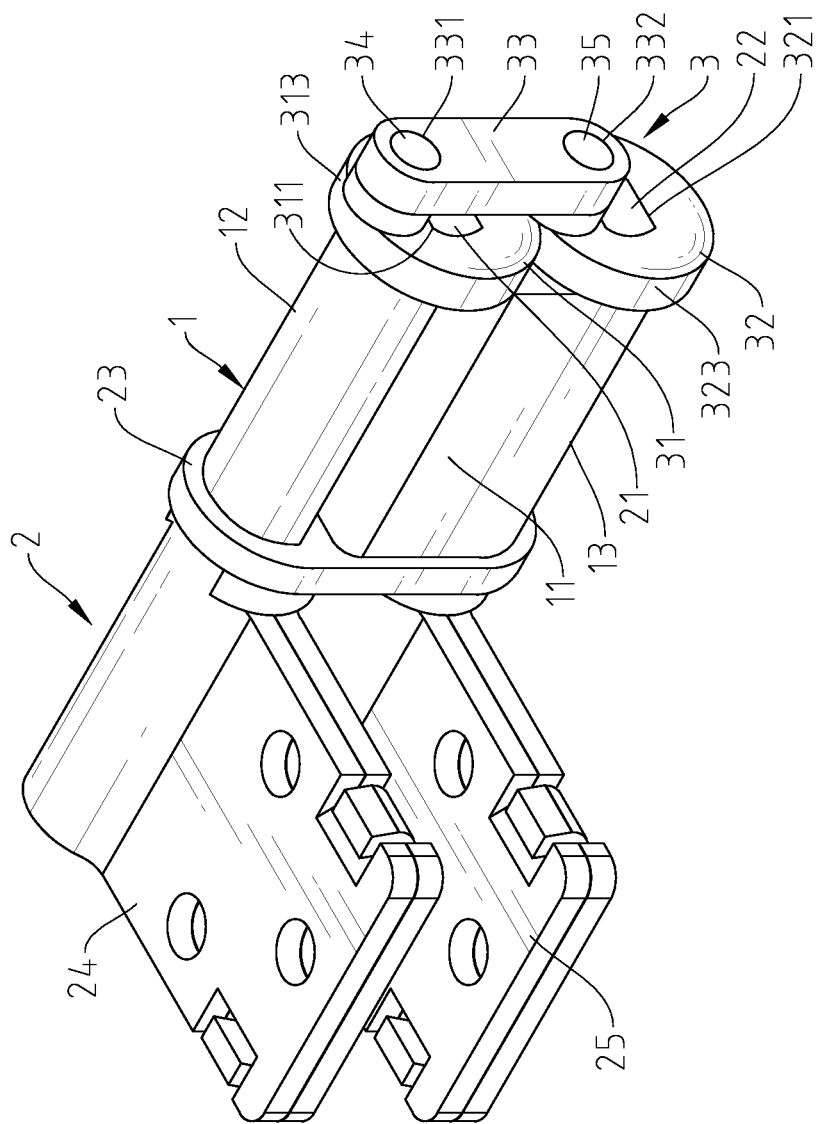
FIG. 1 is an elevational view of a planetary type dual-shaft hinge in accordance with the present invention.
Figure 2:
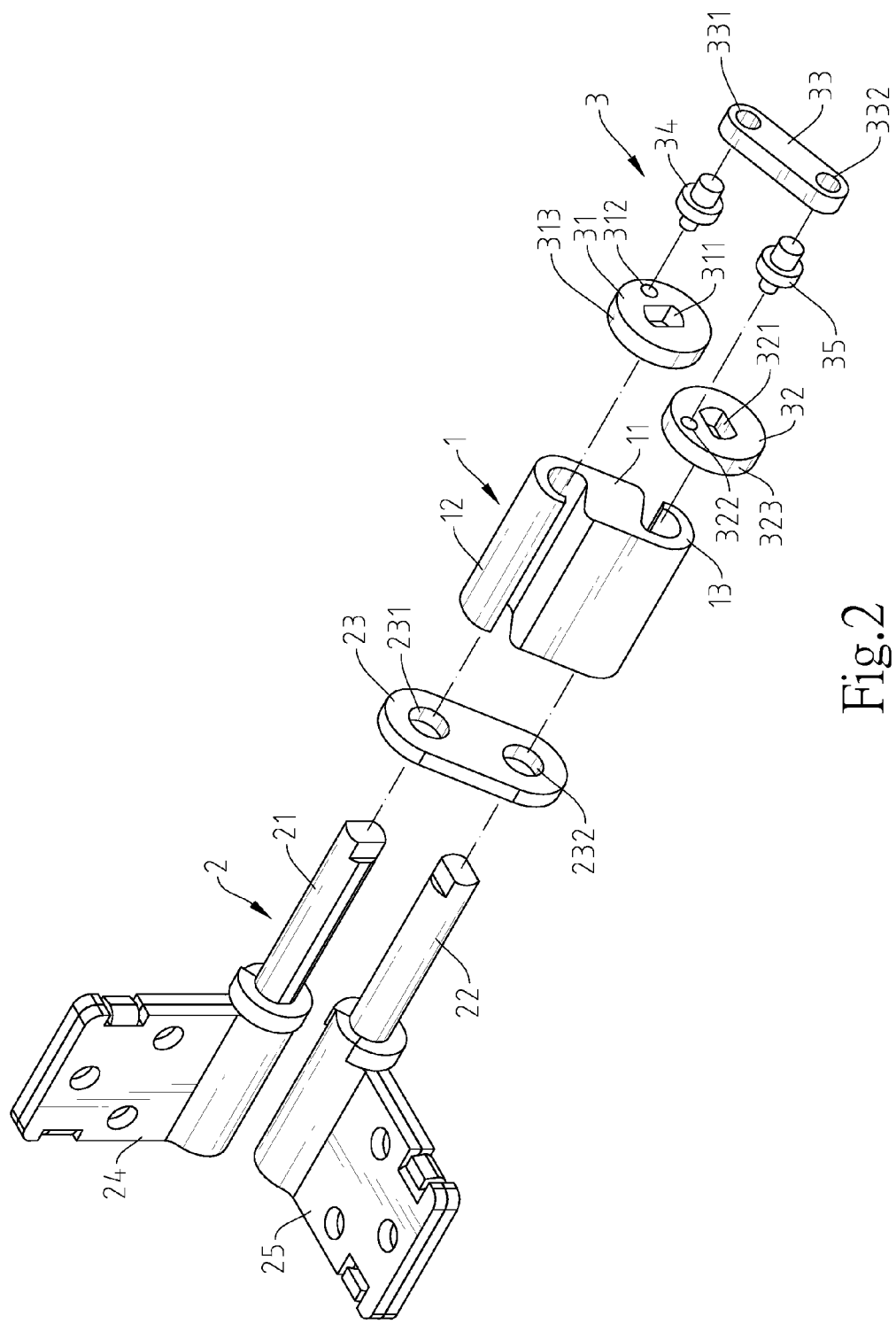
FIG. 2 is an exploded view of the planetary type dual-shaft hinge in accordance with the present invention.

Referring to FIGS. 1 and 2, a planetary type dual-shaft hinge in accordance with the present invention is shown. The planetary type dual-shaft hinge comprises a female shaft member 1, a male shaft set 2, and a transmission mechanism 3.

The female shaft member 1 comprising a shaft body 11 defining a first barrel 12 and a second barrel 13 in a parallel manner.

The male shaft set 2 comprises a first shaft 21, a second shaft 22, and a constraint plate 23. The constraint plate 23 defines a first constraint hole 231 and a second constraint hole 232. Further, the constraint plate 23 is disposed at one side relative to the female shaft member 1. The first shaft 21 is inserted through the first constraint hole 231 of the constraint plate 23 and the first barrel 12 of the female shaft member 1. The second shaft 22 is inserted through the second constraint hole 232 of the constraint plate 23 and the second barrel 13 of the female shaft member 1. Further, the shaft 21 and the second shaft 22 are respectively affixed to a first hinge plate 24 and a second hinge plate 25.

The transmission mechanism 3 comprises a first transmission member 31, a second transmission member 32, a link 33, a first coupling shank 34, and a second coupling shank 35. The first transmission member 31 is a circular plate member, defining a first non-circular center mounting hole 311 attached to one end of the first shaft 21 remote from the first hinge plate 24 for synchronous rotation with the first shaft 21, a first pivot hole 312 disposed at one side relative to the first non-circular center mounting hole 311 in a parallel manner, and a first bearing surface 313 around the circular periphery thereof. The second transmission member 32 is a circular plate member, defining a second non-circular center mounting hole 321 attached to one end of the second shaft 22 remote from the second hinge plate 25 for synchronous rotation with the second shaft 22, a second pivot hole 322 disposed at one side relative to the second non-circular center mounting hole 321 in a parallel manner, and a second bearing surface 323 around the circular periphery thereof. Further, the combined length of the radius of the first transmission member 31 and the radius of the second transmission member 32 is equal to the distance between the center axis of the first shaft 21 and the center axis of the second shaft, enabling the first bearing surface 313 of the first transmission member 31 to be stopped against the second bearing surface 323 of the second transmission member 32. The link 33 is an elongated plate member defining a first through hole 331 and a second through hole 332. The first coupling shank 34 has its two opposite ends respectively pivotally coupled to the first pivot hole 312 of the first transmission member 31 and the first through hole 331 of the link 33. The second coupling shank 35 has its two opposite ends respectively pivotally coupled to the second pivot hole 322 of the second transmission member 32 and the second through hole 332 of the link 33. Further, the distance between the coupling point between the first coupling shank 34 and the link 33 and the coupling point between the second coupling shank 35 and the link 33 is equal to the distance between the center axis of the first shaft 21 and the center axis of the second shaft 22. Further, because the first coupling shank 312 and the second coupling shank 322 are disposed at one side relative to the first non-circular center mounting hole 311 and the second non-circular center mounting hole 321, the pivoting point between the link 33 and the first transmission member 31 is deviated from the connection point between the first transmission member 31 and the first shaft 21, and the pivoting point between the link 33 and the second transmission member 32 is deviated from the connection point between the second transmission member 32 and the second shaft 22, and the distance between the pivoting point between the link 33 and the first transmission member 31 and the pivoting point between the link 33 and the second transmission member 32 is equal to the distance between the center axis of the first shaft 21 and the center axis of the second shaft 22.

Figure 3:
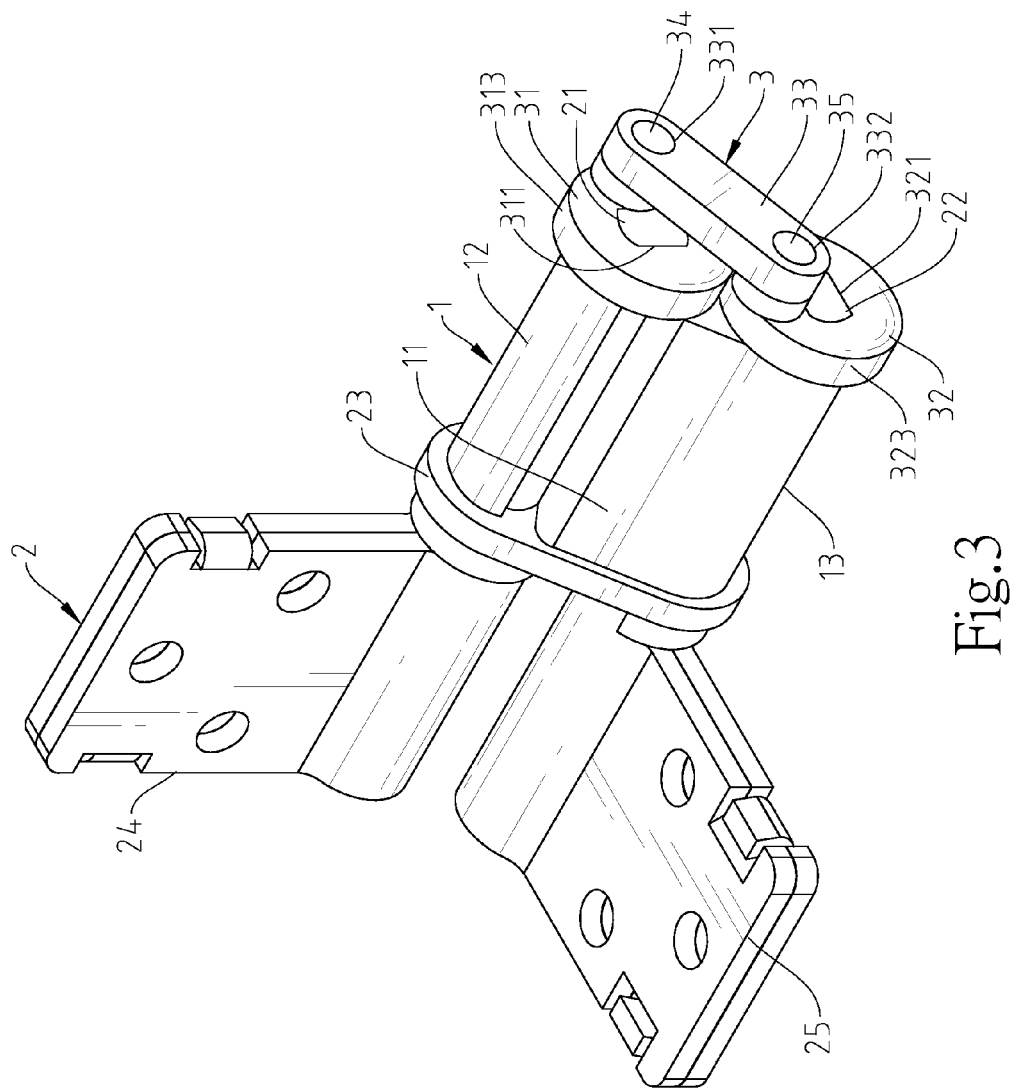
FIG. 3 is an operational view of the planetary type dual-shaft hinge in accordance with the present invention.
Figure 4:
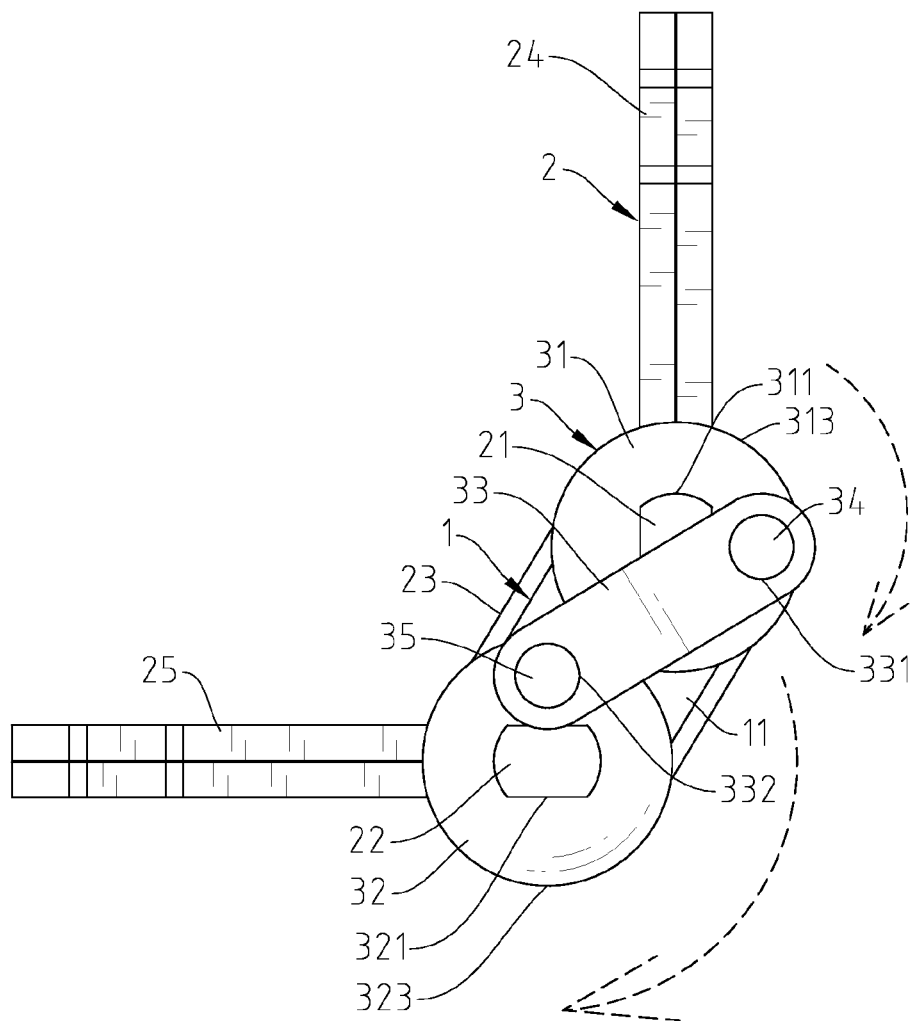
FIG. 4 is a schematic side view illustrating an operation status of the planetary type dual-shaft hinge in accordance with the present invention.

Referring to FIGS. 3 and 4 and FIG. 2 again, when biasing the first hinge plate 24 to rotate the first shaft 21, the first shaft 21 drives the first transmission member 31 to rotate. Because the pivoting point between the first coupling shank 34 and the link 33/first transmission member 31 is deviated from the connection point between the first transmission member 31 and the first shaft 21, rotating the first transmission member 31 can drive the first coupling shank 34 to push the link 33. Further, because the two opposite ends of the link 33 are respectively pivotally coupled to the first transmission member 31 and the second transmission member 32, the thrust force produced during rotary motion of the first coupling shank 34 can drive the first transmission member 31 to turn about the second transmission member 32, allowing smooth rotation of the first shaft 21.

Figure 5:
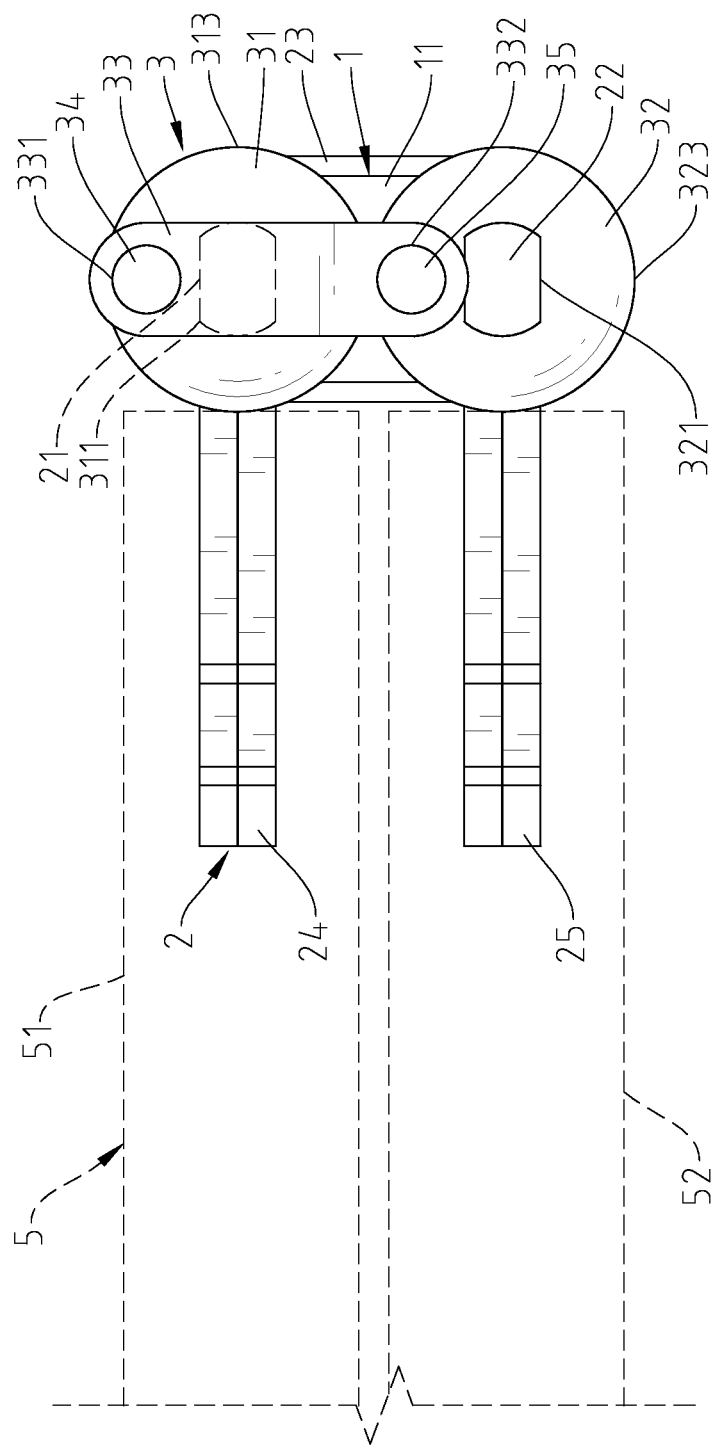
FIG. 5 is a schematic applied view of the present invention, illustrating the first hinge plate and second hinge plate of the planetary type dual-shaft hinge respectively affixed to a cover member and a base member of a flip-up electronic product.
Figure 6:
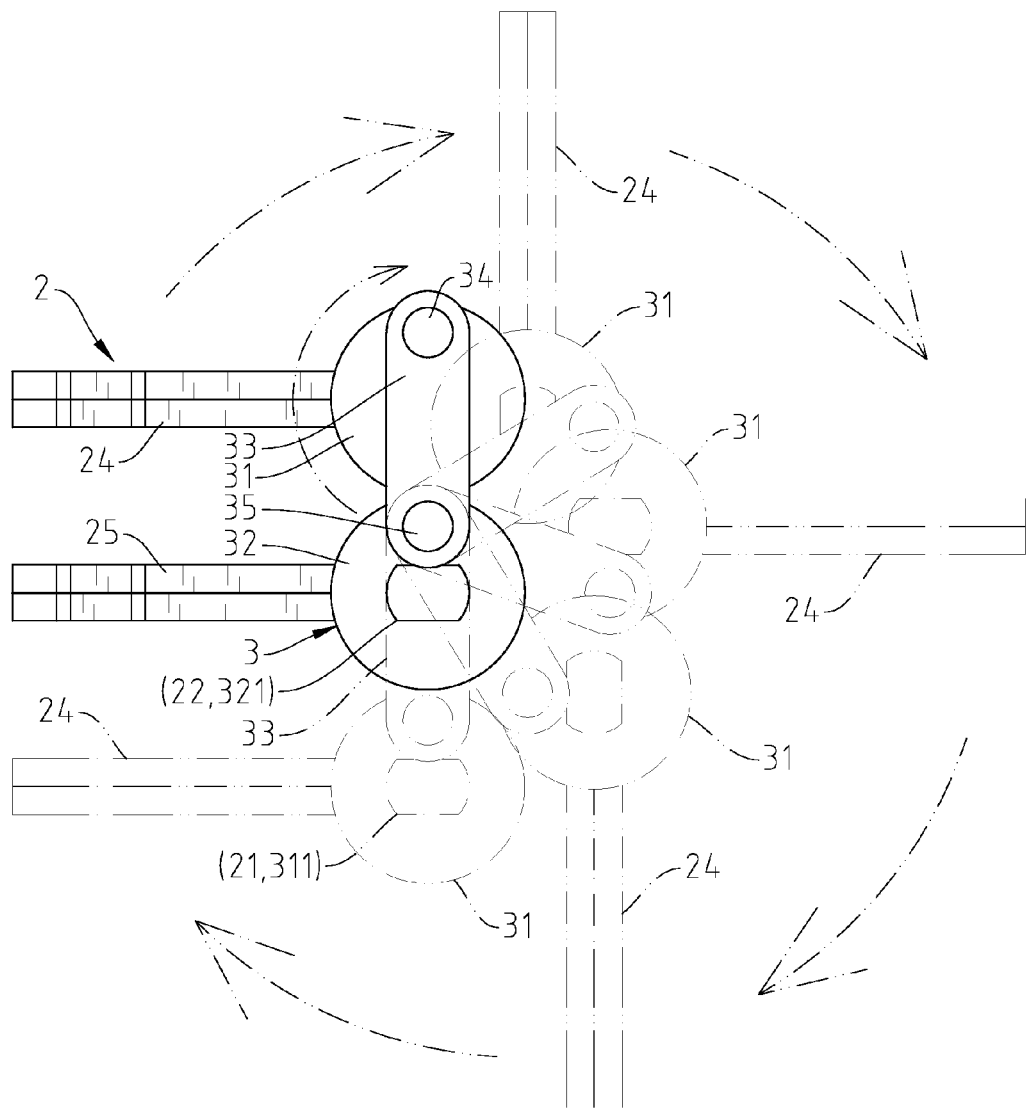
FIG. 6 corresponds to FIG. 5, illustrating the cover member of the flip-up electronic product opened from the base member and the first transmission member turned about the second transmission member.

Referring to FIGS. 5 and 6 and FIG. 2 again, when using the planetary type dual-shaft hinge in a flip-up electronic produce 5, the first hinge plate 24 and the second hinge plate 25 are respectively affixed to cover member 51 and base member 52 of the flip-up electronic product 5. When opening the cover member 51 from the base member 52, the first transmission member 31 will be turned about the second transmission member 32. According to the present preferred embodiment, the first transmission member 31 can be rotated on its own axis and turned about the second transmission member 32 from a top side toward a bottom when the user opens the cover member 51 from the base member 52. Although the angle of rotation of the first transmission member 31 is within 180-degrees, the cover member 51 of the flip-up electronic product 5 can be turned to the bottom side of the base member 52. Further, because the first bearing surface 313 of the first transmission member 3 is abutted against the second bearing surface 323 of the second transmission member 32, the second bearing surface 323 of the second transmission member 32 can positively support the first transmission member 31 when the first transmission member 31 is being turned about the second transmission member 32, assuring smooth rotary motion of the first transmission member 31.

As stated above, the key technology of the present invention that eliminates the drawbacks of conventional designs is that the invention enables the female shaft member 1 to be sleeved onto the first shaft 21 and the second shaft 22, the first transmission member 31 and the second transmission member 32 to be fixedly connected to the first shaft 21 and the second shaft 22, and the link 33 pivotally coupled to the first transmission member 31 and the second transmission member 32 in such a manner that the pivoting point between the link 33 and the first transmission member 31 is deviated from the connection point between the first shaft 21 and the first transmission member 31 and the pivoting pint between the link 33 and the second transmission member 32 is deviated from the connection point between the second shaft 22 and the second transmission member 32, and thus, rotating the first shaft 21 can drive the first transmission member 31 to turn about the second transmission member 32 smoothly.

Although a particular embodiment of the invention has been described in detail for purposes of illustration, various modifications and enhancements may be made without departing from the spirit and scope of the invention.

What is claimed is:
1. A planetary type dual-shaft hinge, comprising:
a female shaft member comprising a shaft body defining a first barrel and a second barrel in a parallel manner;
a male shaft set comprising a first shaft rotatably inserted through said first barrel of said female shaft member, and a second shaft rotatably inserted through said second barrel of said female shaft member; and
a transmission mechanism comprising a first transmission member fixedly connected to one end of said first shaft, a second transmission member fixedly connected to one end of said second shaft, and a link having opposite first end and second end thereof respectively pivotally coupled to said first transmission member and said second transmission member, said first transmission member and said second transmission member being disposed at one same side relative to said female shaft member, the pivoting point between said link and said first transmission member being deviated from the connection point between said first transmission member and said first shaft, the pivoting point between said link and said second transmission member being deviated from the connection point between said second transmission member and said second shaft;
wherein said transmission mechanism further comprises a first coupling shank pivotally coupled between said first transmission member and said first end of said link, and a second transmission member pivotally coupled between said second transmission member and said second end of said link, said first transmission member defining therein a first pivot hole pivotally coupled to one end of said first coupling shank, said second transmission member defining therein a second pivot hole pivotally coupled to one end of said second coupling shank, said link comprising a first through hole located at said first end and pivotally coupled to an opposite end of said first coupling shank and a second through hole located at said second end and pivotally coupled to an opposite end of said second coupling shank.

2. The planetary type dual-shaft hinge as claimed in claim 1, wherein the distance between the pivoting point between said link and said first transmission member and the pivoting point between said link and said second transmission member is equal to the distance between the center axis of said first shaft and the center axis of said second shaft.

3. The planetary type dual-shaft hinge as claimed in claim 1, wherein said first transmission member defines therein a first non-circular center mounting hole; said first shaft has one end thereof fixedly fastened to said first non-circular center mounting hole of said first transmission member; said second transmission member defines therein a second non-circular center mounting hole; said second shaft has one end thereof fixedly fastened to said second non-circular center mounting hole of said second transmission member.

4. The planetary type dual-shaft hinge as claimed in claim 1, wherein said male shaft set further comprises a constraint plate disposed at one said relative to said female shaft member and opposite to said first transmission member and said second transmission member, said constraint plate comprising a first constraint hole and a second constraint hole respectively located at two opposite ends thereof; said first shaft is inserted through said first constraint hole of said constraint plate into said first barrel of said female shaft member; said second shaft is inserted through said second constraint hole of said constraint plate into said second barrel of said female shaft member.

5. The planetary type dual-shaft hinge as claimed in claim 1, wherein said first transmission member is a circular plate member defining a first bearing surface around the periphery thereof; said second transmission member is a circular plate member defining a second bearing surface around the periphery thereof and abutted against said first bearing surface of said first transmission member, the combined length of the radius of said first transmission member and the radius of said second transmission member is equal to the distance between the center axis of said first shaft and the center axis of said second shaft.

* * * * *